United States Patent
Champeaux

[11] 3,883,984
[45] May 20, 1975

[54] PUPPET LIKE DUMMY

[76] Inventor: Albert Champeaux, 9 Bis, Rue Michel Chasles, Paris, France, 75012

[22] Filed: Nov. 28, 1973

[21] Appl. No.: 419,700

[30] Foreign Application Priority Data
Dec. 12, 1972 France .............................. 72.44104

[52] U.S. Cl. ...................................... 46/22; 46/241
[51] Int. Cl. ............................................. A63h 33/00
[58] Field of Search ................................ 46/22, 241

[56] References Cited
UNITED STATES PATENTS

| | | | |
|---|---|---|---|
| 2,919,516 | 1/1960 | Schaefer | 46/22 |
| 3,375,604 | 4/1968 | Alonso | 46/241 |
| 3,660,926 | 5/1972 | Lerner et al. | 46/22 |

*Primary Examiner*—Louis G. Mancene
*Assistant Examiner*—Robert F. Cutting
*Attorney, Agent, or Firm*—McGlew and Tuttle

[57] ABSTRACT

A dummy comprising a plurality of elements displaceable relatively to each other for representing various attitudes or expressions of the model symbolized by the dummy, wherein the elements are connected to each other by magnetic connections cooperating with mating respective surfaces of the elements.

9 Claims, 1 Drawing Figure

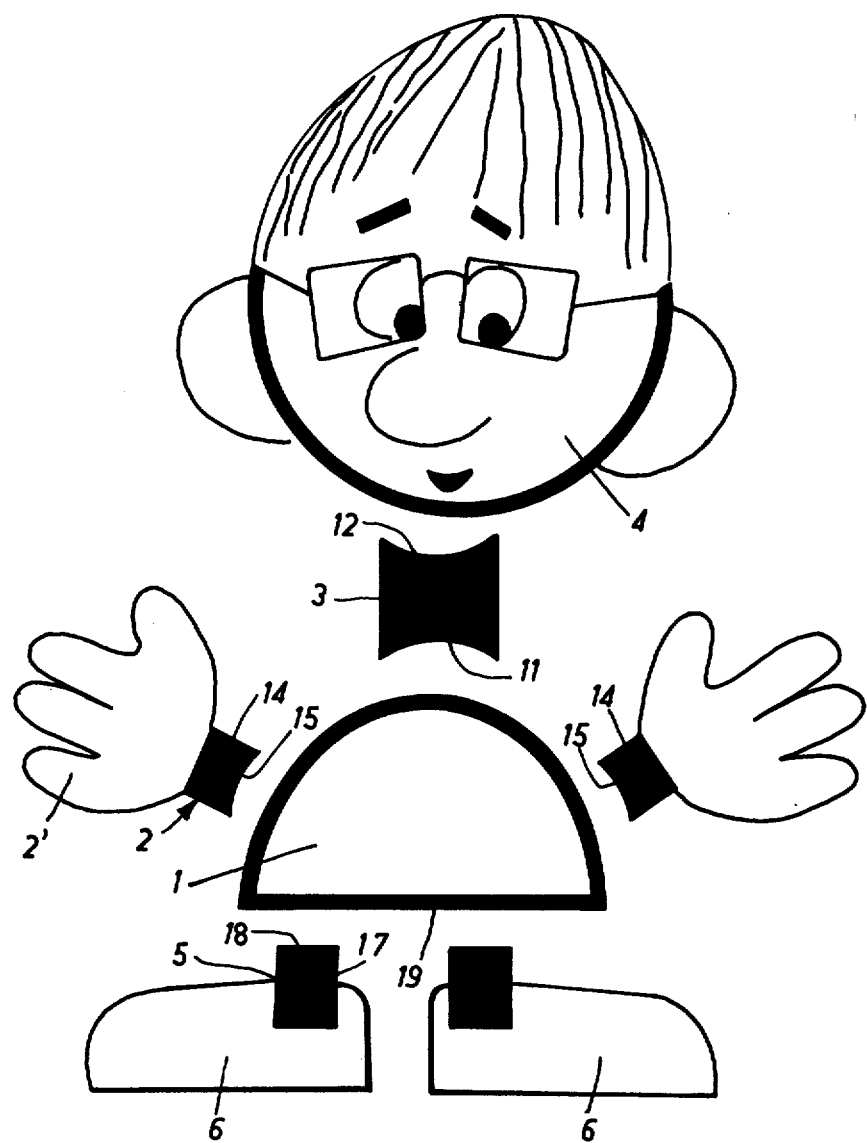

PUPPET LIKE DUMMY

FIELD AND BACKGROUND OF THE INVENTION

The instant invention is related to a dummy, and more particularly to a puppet-like, or marionette-like, dummy.

Dummies of this kind are widely used in the fields of cinematography, television, manufacture of toys, decoration of commercial and other displays, etc..

It is desirable that such dummies be able to represent a great number of various attitudes corresponding to chosen attitudes or expressions of the model portrayed, symbolized, or caricatured by the dummy, such models being human or imaginary beings, animals, plants, or even objects of various kinds.

SUMMARY OF THE INVENTION

It is a primary object of the present invention to provide a dummy of a particularly simple and rugged construction which may be brought easily into a practically unlimited number of various positions representing the above mentioned attitudes of the related model.

It is also an object of the invention to provide a dummy of the above mentioned kind, which may be manufactured easily and at very low cost.

A further object of the instant invention is to provide a dummy of the above mentioned type having a plurality of interconnected elements the relative position of which may be changed at will without any appreciable wear or fatigue of the elements, whereby the useful lifetime of the dummy is substantially increased, and is in fact practically unlimited.

These and other advantageous objects are achieved by the dummy according to the instant invention, which is constituted by a plurality of elements representing, respectively, portions of the model which may be chosen from the group comprising a human body, an animal, a plant, an object and an imaginary being, the elements of the dummy being maintained in any desired position relative to each other by magnetic connecting means acting on adjacent respective surfaces of the elements.

The construction of the dummy according to the invention is very simple. The dummy is not fragile, and the user may easily displace or modify the relative position of the various elements of the dummy so as obtain a practically unlimited number of different attitudes of the same. The dummy according to the invention may be used in the field of motion-picture cartoons, where fast and easy assembly, immediate interchangeability and facility of changing the attitudes or corporal and/or facial expressions of the dummy are of paramount importance. The instant dummy may also be used as a toy, or for display purposes.

In one embodiment of the present invention at least two of the adjacent respective surfaces of said elements of the dummy are mating spherical surfaces which are respectively convex and concave.

In another embodiment at least some of the adjacent surfaces are planar surfaces.

In still another embodiment at least one of the above mentioned magnetic connecting means comprises an intermediary magnetic element two opposite surfaces of which are mated with corresponding surfaces defined, respectively, by two other elements to be connected to each other.

Some of the elements representing portions of the model may be made themselves partially or entirely of magnetic material or of ferro-magnetic material and connected to each other by connecting elements made at least partially of magnetic material.

Other objects, features and advantages of the instant invention will becomee apparent from the description herein below which refers to the appended drawing and relates to an embodiment of the invention, by way of example, but is not to be construed as limiting the scope of the invention.

BRIEF DESCRIPTION OF THE DRAWING

The single FIGURE of the drawing shows a dummy according to the invention, which represents a human being in the form of a caricature.

DESCRIPTION OF THE PREFERRED EMBODIMENTS

The dummy shown comprises substantially seven main elements representing respectively a body 1 to which are connected two arms 2, a neck 3 carrying a head 4, and two legs 5 connected to body 1. In the present embodiments the arms 2 are very short, and they carry hands shown at 2'. Similarly, the legs 5 are very short and carry feet shown at 6.

The top portion of the body 1 is constituted by a spherical portion which is made entirely of ferro-magnetic material, and may be hollow or solid. The head 4 comprises a spherical piece of ferro-magnetic material, which may also be whole or hollow. Head 4 is connected to body 1 by the neck 3 which is constituted by a magnet having two opposed faces 11, 12 of concave spherical configuration. Spherical surfaces 11 and 12 have, for example, the same radius of curvature equal to that of the associated convex spherical surfaces of body 1 and head 4.

Each arm 2 has, at its inner end directed toward body 1, a magnet 14 the free end surface 15 of which is a concave spherical surface having the same radius of curvature as the convex spherical surface of the top portion of body 1.

Each leg 5 also comprises a magnet 17, the respective free end surfaces of which are planar surfaces adapted to be applied onto a planar surface 19 defined on the bottom portion of body 1.

Magnets 3, 14 and 17 maintain respectively head 4, arms 2 and legs 5 of the dummy on body 1 in whichever selected position is chosen by the user. As the magnets have spherical or planar surfaces which mate with the surfaces of the elements onto which they are placed, the various elements constituting the dummy may be displaced very easily with respect to each other, whereby the dummy may easily take any one of a practically unlimited number of attitudes representing corresponding attitudes or expressions of the model, i.e., in the embodiment shown, of a human being.

It will be understood that magnetic connection means similar to those described herein above may also be used for mounting elements representing the eyes, the nose and/or the mouth, etc. at any desired convenient location and in any desired position.

In another embodiment at least one part of the dummy may be constituted by two elements and connected to at least one other part or element by a ball bearing-like connection comprising a sphere of ferro-magnetic material which is engaged in a recess defined by mating magnetic concave spherical end portions of the first part. Similarly the arms and legs of the dummy shown in the drawing may be constituted each by two articulated elements, the elbow or/and the knee of each arm or leg being materialized by ball bearing-like connections of the above indicated type.

It will be understood that, generally speaking, the magnetic connecting means of the instant dummy comprise magnets which may be displaced with respect to the surfaces of associated elements, the magnets being integral each with one element, or constituted by independent elements having two opposite surfaces the shape of which mates with respective surfaces of two elements of the dummy to be connected to each other by any one of the magnets.

It will also be understood that the user is enabled to vary, in a practically unlimited manner, the relative positions of the various elements of the instant dummy.

The portion of the dummy which engages the surface supporting the same may advantageously comprise magnetic elements, the supporting surface being advantageously defined by a layer of ferro-magnetic material.

It should be noted that the term "spherical surfaces" used in the above description and the claims hereinafter is deemed to designate not only truly spherical surfaces, but also similar curved surfaces, such as ovoid or paraboloid surfaces, or even surfaces presenting projecting and recessed portions such as the surface of a potato.

While one specific embodiment of the invention has been described herein above to illustrate the principles thereof, it will be understood that various modifications may be made to the described embodiment without departing from the scope and spirit of the invention.

What is claimed is:

1. A dummy comprising, in combination, a plurality of elements displaceable relative to each other for representing various attitudes of a model symbolized by said dummy; at least two of said elements constituting main elements formed of a ferro-magnetic material and each having at least one substantially spherical surface portion; at least one other of said elements being constituted by a permanent magnet interposed between said two ferro-magnetic main elements; said permanent magnet having two opposite pole surfaces each in magnetic engagement with a spherical surface portion of a respective main element; said pole surfaces being concave and substantially complementary to the engaged spherical surface portion.

2. A dummy, as claimed in claim 1, wherein said main elements are hollow.

3. A dummy, as claimed in claim 1, in which said displaceable elements include complementary elements each integral with a permanent magnet having a pole surface which is concave and complementary to a spherical surface portion of a main element, for maintaining a complementary element in magnetic engagement with a main element.

4. A dummy, as claimed in claim 1, in which at least one of said main elements has a substantially planar surface portion.

5. A dummy, as claimed in claim 4, wherein said main elements are hollow.

6. A dummy, as claimed in claim 1, in which at least one of said main elements has a substantially planar surface portion; said displaceable elements including complementary elements each having a permanent magnet engageable with said planar surface portion for magnetic engagement of the associated complementary element with said planar surface portion.

7. A dummy comprising, in combination, a plurality of elements representing, respectively, the torso, the head, the neck, the arms and hands, and the legs and feet of a simulated human being; said head representing element having a substantially spherical convex lower surface portion formed of a ferro-magnetic material; said torso representing element having a substantially spherical upper surface portion formed of a ferro-magnetic material and having a substantially planar lower surface portion formed of a ferro-magnetic material; said neck representing element being constituted by a first permanent magnet having two opposite spherically concave pole surfaces respectively complementary to the convex surface portions of said head and torso representing elements; said first permanent magnet being adapted to be interposed between, and to magnetically connect, said head and torso representing elements; said arms and hands representing elements and said legs and feet representing elements each including a permanent magnet having a pole surface engageable with a ferro-magnetic surface of said torso representing element for magnetic connection of the associated arms and hands representing element and the associated legs and feet representing element with said torso representing element.

8. A dummy, as claimed in claim 7, in which said head representing element and said torso representing element are hollow.

9. A dummy, as claimed in claim 7, further comprising additional elements representing respective facial features; each facial feature representing element including a permanent magnet having a pole face which is spherically concave for engagement with the spherical surface portion of said head representing element for magnetically connecting the facial feature representing elements to said head representing elements.

* * * * *